Dec. 30, 1969  J. B. WHITE  3,487,423

METHOD AND APPARATUS FOR PRODUCING STEAM

Filed July 11, 1968

*INVENTOR.*
JOHN B. WHITE
BY
MARCUS L. BATES

United States Patent Office 3,487,423
Patented Dec. 30, 1969

---

3,487,423
METHOD AND APPARATUS FOR PRODUCING STEAM
John B. White, Odessa, Tex., assignor of thirty-one and two-thirds percent to Dale E. White, Odessa, Tex., thirty-one and two-thirds percent to Royce C. Mitchell, Odessa, Tex., and five percent to Marshall E. Moore
Filed July 11, 1968, Ser. No. 744,205
Int. Cl. F01d 1/00; H05b 7/18; B23k 9/00
U.S. Cl. 60—108                    5 Claims

ABSTRACT OF THE DISCLOSURE

A method and apparatus for producing steam using electrical current and an electrical arc along with a suitable source of water. The electrical arc discharges within an enclosure to provide a high temperature region. Water force flowed through the enclosure and in intimate contact with the high temperature region is vaporized into steam. The steam can be utilized in several different manners, such as driving a steam turbine or to provide a source of steam for a steam cleaner.

BACKGROUND OF THE INVENTION

Steam generators are generally complex apparatus requiring a heat generator in the form of hydrocarbon consuming burners which provide a source of heat in order to vaporize water. The water is usually contained within steam forming coils. Most steam generators require expert personnel for the operation thereof because malfunction of any one of a multiplicity of safety devices associated therewith can cause the steam generator to explode. The generation of steam is therefore a costly endeavor and for this reason other sources of heat are often substituted for steam because of economic considerations. Furthermore, most steam generators of the prior art require a considerable amount of time to elapse in order to build up or generate a steam supply, unless the steam generator is maintained in the "stand-by" configuration. This is especially so where a source of superheated steam is desired, for superheated steam usually involves the use of primary and secondary steam generating coils wherein vaporized water from the primary coils is conducted under pressure through a series of secondary tubes or coils wherein the saturated steam is further heated by a source of heat energy.

SUMMARY OF THE INVENTION

This invention is directed to a method of producing steam using electrical current to establish a high temperature region by means of an electrical arc. A source of water is flow conducted into intimate contact with the high temperature region which causes the water to immediately vaporize. This action provides an instantaneous source of steam. Control of the water flow rate and the intensity of the high temperature region controls the degree of superheat of the water.

Apparatus for carrying out the above method includes an enclosure having an electrical arc associated therewith with the water being flow conducted into close proximity to the high temperature region. A steam outlet enables the expanded water vapor to escape from the enclosure with the outlet providing the source of steam. This source of steam can be utilized as an economical and instantaneous means of attaining steam for a number of uses including actuating a steam cleaner or a turbine.

It is therefore a primary object of this invention to provide a source of steam by the utilization of an electrical arc.

Another object of the present invention is to provide a method of generating steam wherein the steam generator can immediately supply steam upon demand.

A still further object of the present invention is the provision of a method of instantaneous generating steam, including superheated steam, by the use of an electrical arc.

Another object of the present invention is the production of steam by utilizing a plasma-jet type generator which vaporizes water by the use of an electrical arc.

Another object of the present invention is the provision of an improved steam cleaner.

A further object of the present invention is the provision of a source of power which utilizes steam with the steam being generated by vaporizing water with heat provided by an electrical arc.

Still another object of the present invention is the provision of a steam generator which is economical in cost, safe in operation, and simple in design.

The above objects are attained in accordance with the present invention by the provision of both method and apparatus which enables the production of steam in a manner as substantially outlined in the above abstract and summary.

DETAILED DESCRIPTION OF THE DRAWINGS

Figure 1:
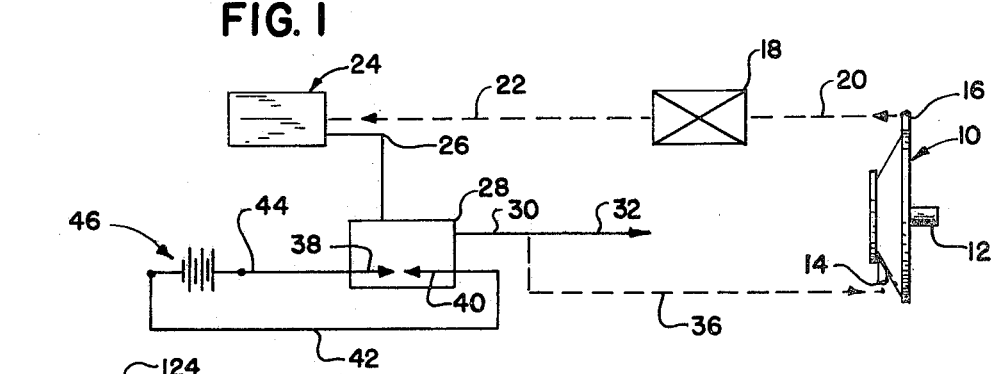
FIGURE 1 schematically sets forth a closed steam generating system made in accordance with one form of the present invention.

Throughout the several figures of the drawings like or similar numerals will apply to like or similar elements wherever possible. In FIGURE 1 there is schematically set forth a steam turbine 10 having an output shaft 12 depending therefrom. The turbine includes a steam inlet 14 and steam exhaust 16. Condenser 18 has flow conduits 20 and 22 attached thereto in order to return condensed water to the suction side of pump 24. Water inlet 26 sprays or otherwise conducts a flow of water into the enclosure 28. Generated steam outlet 30 is illustrated at 32 as being connected to a suitable outlet which may be in the form of a nozzle, as for example the nozzle of a steam cleaner (not shown). Steam outlet 30 is also connected by a conduit 36 to the before mentioned steam inlet 14.

Electrodes 38 and 40 are movable with respect to each other in a manner to enable an arc to be established therebetween so as to provide enclosure 28 with a high temperature region therein. The arc is connected by means of electrical conduits 42 and 44 to a source of electrical current, diagrammatically illustrated by the arrow at numeral 46. One suitable source of current which has been found to be satisfactory is two standard D.C. arc welders, connected in series with one another.

Figure 2:
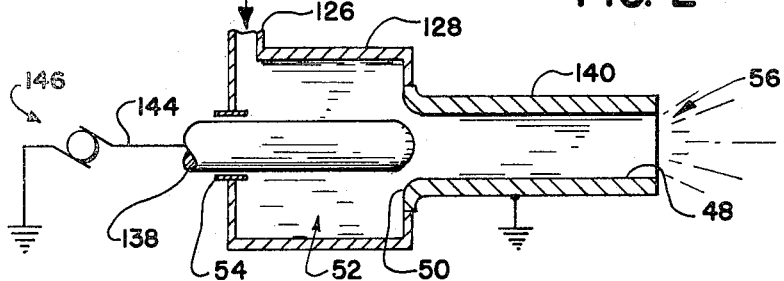
FIGURE 2 is a partly schematical, partly diagrammatical cross-sectional representation of another embodiment of the present invention.

Looking now to the details of FIGURE 2, a water pump 124 provides a high pressure source of fluid flow to inlet 126. Inlet 126 can be either radially or tangentially arranged with respect to the enlarged portion 128 of the enclosure which forms a cylindrical enlarged chamber for water preheat. Metal nozzle 140 is provided with the illustrated electrical ground. The nozzle extends a suitable distance in length in order to provide a means of conducting an arc from electrode 138 to the polished inside peripheral wall surface of the nozzle. The length of nozzle 140 can be varied to control the residence time of the steam within the nozzle during its travel therethrough. The interior of chamber 52 converges as seen at 50, with portion 50 forming a circumferentially extending annulus in conjunction with the electrode. The electrode is received within seal means 54 which enables the electrode to be adjustable with respect to the nozzle. Electrical lead 144 is connected to a suitable grounded generator 146 and preferably is provided with a high intensity arc section (not shown) so as to enable a convenient means by which the arc may be initiated. Numeral 56 generally indicates the high pressure superheated steam escaping from the nozzle outlet. The hot gases emerging at 56 is sometime referred to as a plasma-jet.

Figure 3:
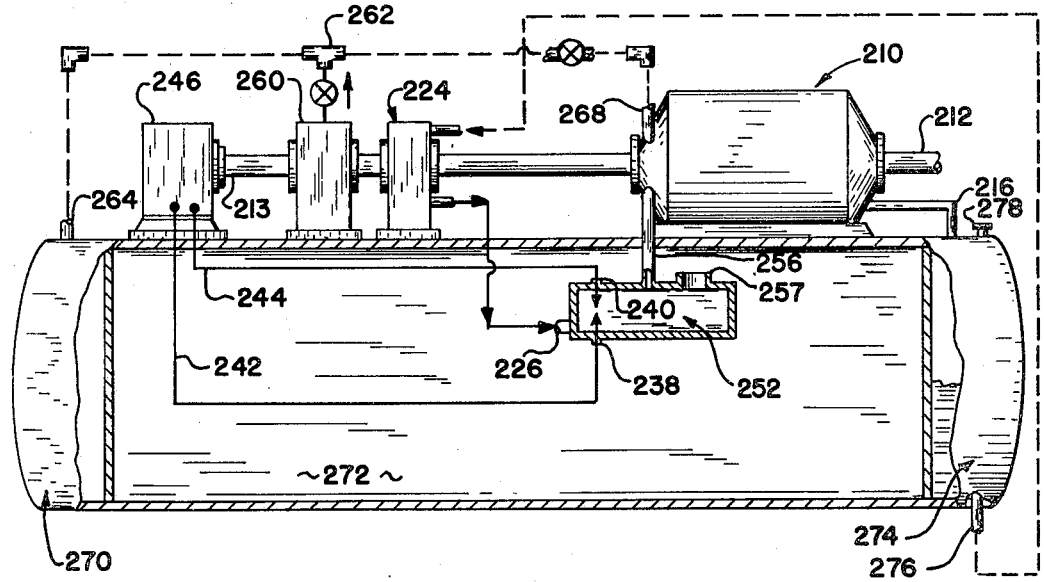
FIGURE 3 is a longitudinal partly cross-sectional representation of still another embodiment of the present invention, with some parts being shown unsectioned in order to more clearly illustrate the apparatus.

Looking now to the details of FIGURE 3, which embodies some of the teachings of FIGURES 1 and 2, there is seen an elongated storage tank which is divided into compartments by means of the illustrated vertically positioned bulkheads so as to form air storage tank 270, steam chest 272, and water tank 274. Water outlet 276 is connected to the suction side of water pump 224 which in turn is connected to water inlet 226 of the arc chamber 252. Filler cap 278 enables the water level within tank 274 to be maintained at a predetermined level. The upper portion of the water tank contains a condenser (not shown) where deemed desirable.

Insulated electrode control rods 238, 240 are attached to spaced apart arc electrodes which are positioned within the chamber with the electrodes being connected to a suitable source of electrical power by means of electrical leads 242 and 244. Generator 246 receives a source of rotational power from shaft 213 and provides at least a portion of the power consumed by the arcs.

Air pump 260 is rotatably actuated by the before mentioned shaft 213 and is flow connected to T-fitting 262 with the illustrated check valve being interposed between the T and the air pump to prevent reverse flow of air therethrough. T-fitting 262 is connected to the air storage tank by means of inlet 264 and also to the turbine starting inlet 268 by means of the illustrated flow control valve. Turbine 210 includes output shaft 212 which delivers usable rotational power. Exhaust steam and/or condensate is received by the upper portion of the water tank by means of flow line 216. Steam outlet 256 communicates with the arc enclosure which in turn is connected from the arc enclosure and to the steam chest by means of passageway 257.

OPERATION

As seen in the diagrammatical representation of FIGURE 1, an arc chamber, defined by enclosure 28, includes arc producing electrodes suitably positioned therein and electrically attached to a source of electrical current. The arc may be initiated between the electrodes by bringing the electrodes into contact with one another after which they are separated a sufficient amount to enable the arc to be sustained therebetween. The water pump provides a suitable high pressure flow of water into the arc chamber and upon the water being subjected to the high temperature region provided by the arc, the water is vaporized into steam whereupon it is forcibly expanded through conduit 30. The temperature and pressure of the steam within conduit 30 is a function of the water flow rate through the arc chamber and the intensity of the high temperature region provided within the chamber by the arc.

Where the steam contained within outlet 30 is to be used for steam cleaning and the like, a flexible hose may be conveniently attached as illustrated at 32 to enable the jet of steam to be impinged upon the item to be cleaned. In this instance, the water supply at 26 can be a conventional domestic water tap and the power supply at 46 can be a conventional arc welder. Accordingly, a conventional arc welder in combination with a conventional water supply can be utilized with the arc chamber 28 in order to provide an economical steam cleaner.

Electrodes 38 and 40 are preferably carbon electrodes, one of which is grounded to the welder and to the enclosure, the other which must be insulated from the enclosure in order to complete the current flow path. It has been found that carbon electrodes three-eighths inch in diameter will maintain an arc of sufficient intensity between adjustments thereof to thereby provide ample time to enable most steam cleaning operations to be carried out. It is considered within the comprehension of this invention to supply known automatic adjustment means to one of the electrodes in order to enable continuous operation of the arc chamber, such an expedient being known to those skilled in the art. One such expedient is the carbon electrode adjustment means associated with commercial movie projectors.

Where it is desired to utilize the steam supply at 30 in order to provide useful work, such as operating a steam turbine, provide a portable supply of steam for heating, and the like; the steam is conducted to the point of usage at 14 and the exhaust steam 20 returned to the condenser 18 whereupon the water is recirculated back to the pump 24. The steam is preferably saturated at exhaust 16.

Looking now to the details of FIGURE 2 wherein there is seen a plasma-jet producing device having a grounded nozzle which provides a flow of current back to the generator at 146. The electrode is slidably or otherwise adjustably received at seal means 54 with the electrode being electrically insulated from the nozzle. The arc must be initiated from the electrode where it impinges along the inside peripheral wall surface 48 of the nozzle. Initiation of the arc is best carried out by imposing a high tensity voltage of sufficient value to jump from the electrode to the nozzle and is preferably of the order of 18,000 volts. Otherwise a small length of carbon from a lead pencil can be used to start or initiate the arc by inserting the lead through the nozzle and into contact with the electrode. With the generator 146 energized, the low current high intensity imposed current will provide a sufficient ionization path to enable the low voltage current from 46 to continue to discharge from the electrode to the nozzle. It is preferable to arrange inlet 126 tangentially with respect to the arc chamber 52 so as to provide a column of spirally flowing gases through the nozzle. Several inlets may be used where deemed desirable.

The water at inlet 126 can be preheated to accelerate vaporization thereof, where deemed desirable. As the water enters tangential opening 126, a large portion impinges against the walls of both the chamber and the inside peripheral wall surface of the nozzle and forms a coolant or heat barrier therefor. In larger installations which consume substantial power, it is necessary to provide the nozzle and chamber with a water cooled jacket to prevent damage to the nozzle. This expedient can also provide the before mentioned preheat for the water by merely conducting the water flow from pump 124, through the water jacket, and then into inlet 126.

The steam producing means of FIGURE 2 can be used wherever an instantaneous source of steam is required at periodic intervals, or where extremely high temperature superheated steam is required.

In the operation of the embodiment seen in FIGURE 3, an elongated cylinder provides three separate tanks as well as mount means for the various equipment associated therewith. The arc chamber 252 is located within the steam chest and includes two parallel flow paths, one to the turbine, the other to the steam chest so as to enable the turbine to take steam directly from the arc chamber and yet be provided with a surge tank. The turbine provides useful work at shaft end 212 and also powers the illustrated water pump, air pump, and generator. The air pump is provided with the illustrated check valve and maintains a suitable supply of air within tank 270 in order to enable the turbine to be brought up to speed after each shut-down.

The water pump suction is connected to the condenser and to the water storage chamber and supplies the arc chamber with a suitable supply of water. As the water is vaporized into superheated steam, a portion of the steam flows into the steam chest, depending upon the rate at which steam flows to the turbine through flow line 256. The exhaust from the turbine flows back to the vapor space within the condenser and water storage tank where the exhaust steam is condensed therewithin. At least a portion of the power for the arc chamber is available from the illustrated generator which is connected to the common shaft at 213.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A method of producing steam using electrical current and an electrical arc comprising the steps of:
   (1) establishing a source of heat energy between two electrodes in an enclosure by employing an electrical arc between the electrodes which is maintained energized by a suitable source of electrical current;
   (2) introducing water under pressure into the enclosure in a manner to cause the water to come into intimate contact with the heat energy of the electrical arc;
   (3) conducting the vaporized water which is formed from the action of the arc upon the water from the enclosure to provide a source of steam.

2. A steam generator including an enclosure, a source of electrical power, an arc producing means, and a source of water;
   said enclosure having means forming a water inlet, a steam outlet, and further including means associated therewith for including said arc producing means therewithin;
   means connecting said source of electrical power to said arc producing means to thereby establish a high temperature region within said enclosure;
   means connecting said source of water to said enclosure, whereby:
       water flows into the enclosure whereupon it becomes vaporized by the high temperature region provided by the arc to thereby cause steam to be formed whereupon the steam escapes through the steam outlet.

3. The steam generator of claim 2, wherein said arc producing means includes two spaced apart electrodes which are movable with respect to each other to thereby vary the intensity of the arc.

4. The steam generator of claim 2, wherein said arc producing means includes an electrode and a metal nozzle, said metal nozzle forming said steam outlet and cooperating with said electrode to enable said source of electrical power to provide an arc between the electrode and the nozzle;
   said source of water further including a pump means for maintaining the water pressure at a value which exceeds the internal enclosure pressure.

5. The steam generator of claim 4, and further including a steam turbine, an air pump, a condenser, and an air storage tank; said steam outlet being connected to said steam turbine, said condenser including a storage tank for said source of water with said condenser being flow connected to the turbine exhaust, said turbine including means for actuating said air pump and said water pump;
   means forming a steam chamber, said enclosure being located within said steam chamber, and means by which said steam chamber is operatively connected to said turbine.

References Cited

UNITED STATES PATENTS

| 591,783 | 10/1897 | McClellan | 219—383 X |
|---|---|---|---|
| 915,526 | 3/1909 | Wonner | 219—383 X |
| 1,368,212 | 2/1921 | Revel et al. | 219—383 X |
| 2,862,099 | 11/1958 | Gage. | |
| 2,906,858 | 9/1959 | Morton. | |
| 3,014,115 | 12/1961 | Ingersoll | 219—383 X |
| 3,185,395 | 5/1965 | Van Deburg | 122—250 X |

CARROLL B. DORITY, Jr., Primary Examiner

U.S. Cl. X.R.

219—121, 383